(12) United States Patent
Foster

(10) Patent No.: US 8,379,134 B2
(45) Date of Patent: Feb. 19, 2013

(54) OBJECT DETECTION AND SELECTION USING GESTURE RECOGNITION

(75) Inventor: Brett Foster, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 464 days.

(21) Appl. No.: 12/713,238

(22) Filed: Feb. 26, 2010

(65) Prior Publication Data

US 2011/0211073 A1    Sep. 1, 2011

(51) Int. Cl.
*G03B 13/00* (2006.01)
*H04N 5/232* (2006.01)

(52) U.S. Cl. ....... 348/345; 348/33; 348/164; 348/211.4; 348/333.01; 348/77; 250/330; 345/156; 345/473; 356/601; 356/602; 356/615; 382/190; 382/209; 382/271; 382/275; 382/278

(58) Field of Classification Search ................ None
See application file for complete search history.

(56) References Cited

U.S. PATENT DOCUMENTS

| | | | | |
|---|---|---|---|---|
| 5,637,871 | A * | 6/1997 | Piety et al. | 250/330 |
| 6,204,852 | B1 | 3/2001 | Kumar et al. | |
| 6,832,008 | B1 * | 12/2004 | Wada | 382/275 |
| 6,961,466 | B2 * | 11/2005 | Imagawa et al. | 382/190 |
| 7,208,733 | B2 * | 4/2007 | Mian et al. | 250/330 |
| 7,340,077 | B2 | 3/2008 | Gokturk et al. | |
| 7,924,312 | B2 * | 4/2011 | Packard | 348/164 |
| 2004/0046737 | A1 | 3/2004 | Numazaki et al. | |
| 2005/0094019 | A1 | 5/2005 | Grosvenor et al. | |
| 2005/0212760 | A1 * | 9/2005 | Marvit et al. | 345/156 |
| 2007/0120996 | A1 | 5/2007 | Boillot | |
| 2007/0130582 | A1 * | 6/2007 | Chang et al. | 725/37 |
| 2008/0018595 | A1 * | 1/2008 | Hildreth et al. | 345/156 |
| 2008/0079837 | A1 | 4/2008 | Masubuchi | |
| 2008/0118156 | A1 | 5/2008 | Okada | |
| 2009/0015703 | A1 | 1/2009 | Kim et al. | |
| 2009/0079813 | A1 * | 3/2009 | Hildreth | 348/14.03 |
| 2010/0020221 | A1 * | 1/2010 | Tupman et al. | 348/333.01 |
| 2010/0100275 | A1 * | 4/2010 | Mian et al. | 701/29 |

FOREIGN PATENT DOCUMENTS

| | | |
|---|---|---|
| WO | WO-2009018279 | 2/2009 |
| WO | 2010/006818 | 1/2010 |

OTHER PUBLICATIONS

Cheung, Humphrey, Sony DSC-N1; Sony announces digital camera with touch-screen focusing—Tom's Hardware Guide; http://www.tomshardware.com/news/sony-dscn1,1487.html; Oct. 4, 2005.

Cullen, Kathleen, Review of the Panasonic Lumix FX500; http://www.pcworld.com/reviews/product/31749/reviewllumix_fx500.html; Jun. 25, 2008.

Goldman, Joshua, Panasonic touch-screen camera gets megapixel bump; http://news.cnet.com/8301-17938_105-10150641-1.html; Jan. 27, 2009.

(Continued)

*Primary Examiner* — Sath V Perungavoor
*Assistant Examiner* — Dakshesh Parikh
(74) *Attorney, Agent, or Firm* — Integral Intellectual Property Inc.; Miriam Paton

(57) ABSTRACT

Object detection and selection for use in a device having digital camera functionality is described. The mechanism detects the occurrence of a gesture by a pointing member in an image frame captured by an IR image sensor. The gesture is then recognized and an object pointed to is detected. The object detected is then selected as a result of the gesture recognition.

22 Claims, 13 Drawing Sheets

OTHER PUBLICATIONS

Ikoma, Norikazu et al., "Fingers Image Tracking on Omnidirection Camera by Condensation Algorithm", Iasted International Conference on ACIT-Signal and Image Processing (ACIT-SIP 2005), Jun. 20-24, 2005, Novosibirsk, Russia, pp. 310-315, 2005.

Perceptive Pixel, Inc. "Multi-Touch solutions", http://www.perceptivepixel.com/solutions.html, 2009.

Wentzel, Jurgen, Extended European Search Report for EP 10 15 4839, Jun. 24, 2010.

Wentzel, Jurgen, First Exam Report for EP 10154839.4, Apr. 4, 2012.

* cited by examiner

OBJECT DETECTION AND SELECTION USING GESTURE RECOGNITION

FIELD OF THE DISCLOSURE

The object detection and selection mechanism related to the field of digital photography, and more particularly related to a system and method for objection detection and selection using hand gesture recognition.

BACKGROUND

Currently, many electronic devices and especially wireless mobile communication devices include, in addition to microprocessors, memory, etc., digital camera functionality to perform tasks that are primary or secondary for the device. For example, a still camera and a video camera are used primarily for taking stills pictures and/or video clips. Other electronic devices, such as smart phones and computers may have such abilities as an added feature.

In the process of taking a photograph using a digital camera, the camera may take different measurements and may even make automatic adjustments according to these measurements. For example, a digital camera may perform Auto White Balancing (AWB), Auto Exposure (AE) and/or Auto Focus (AF), or may perform measurements and indicate the results to an operator, for example on a display of the digital camera. Many such operations may depend on selection of a specific area or object in the field of view of the camera. In one example, area/face detection and/or localization may be used for adjusting focusing, exposure and white balancing (collectively known also as "3A") and setting flash intensity, although other functionality can be driven by area/face detection and/or localization.

BRIEF DESCRIPTION OF THE DRAWINGS

The mechanism is herein described, by way of example only, with reference to the accompanying drawings, wherein:

FIG. 2 is a diagram illustrating finger gesturing by a user to indicate which object the camera should focus on;

DETAILED DESCRIPTION

Notation Used Throughout

Figure 1:
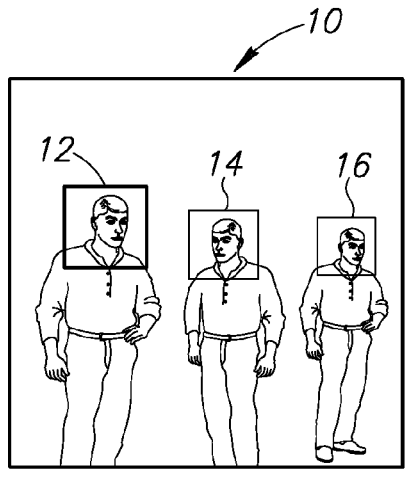
FIG. 1 is a diagram illustrating a sample image to be captured by a digital camera indicating the default object selected by the camera.

The following notation is used throughout this document:

| Term | Definition |
| --- | --- |
| AP | Access Point |
| ARP | Address Resolution Protocol |
| ASIC | Application Specific Integrated Circuit |
| BSS | Basic Service Set |
| BSSID | Basic Service Set ID |
| CDROM | Compact Disc Read Only Memory |
| CPU | Central Processing Unit |
| DHCP | Dynamic Host Configuration Protocol |
| DNS | Domain Name Server |
| DSP | Digital Signal Processor |
| EDGE | Enhanced Data rates for GSM Evolution |
| EEROM | Electrically Erasable Read Only Memory |
| EPROM | Erasable Programmable Read-Only Memory |
| FM | Frequency Modulation |
| FPGA | Field Programmable Gate Array |
| FTP | File Transfer Protocol |
| GPRS | General Packet Radio Service |
| GPS | Global Positioning System |
| GSM | Global System for Mobile communications |
| HDL | Hardware Description Language |
| HTTP | Hyper-Text Transport Protocol |
| IEEE | Institution of Electrical and Electronics Engineers |
| IM | Instant Messaging |
| IP | Internet Protocol |
| LAN | Local Area Network |
| MAC | Media Access Control |
| PC | Personal Computer |
| PCI | Peripheral Component Interconnect |
| PDA | Personal Digital Assistant |
| PNA | Personal Navigation Assistant |
| RAM | Random Access Memory |
| RAT | Radio Access Technology |
| RF | Radio Frequency |
| ROM | Read Only Memory |
| RSSI | Received Signal Strength Indicator |
| RUIM | Re-Usable Identification Module |
| SDIO | Secure Digital Input/Output |
| SIM | Subscriber Identity Module |
| SPI | Serial peripheral interconnect |
| SSID | Service Set Identifier |
| TCP | Transport Control Protocol |
| UI | User Interface |
| URL | Uniform Resource Locator |
| USB | Universal Serial Bus |
| UWB | Ultra-Wideband |
| WAN | Wide Area Network |
| WAP | Wireless Access Point |
| WAP | Wireless Application Protocol |
| WEP | Wired Equivalent Protocol |
| WLAN | Wireless Local Area Network |

DETAILED DESCRIPTION

Note that some aspects of the mechanism described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits implemented in an Application Specific Integrated Circuit (ASIC) or Field Programmable Gate Array (FPGA), or as functionally equivalent discrete hardware components.

As will be appreciated by one skilled in the art, the object detection and selection mechanism may be implemented as a system, method, computer program product or any combination thereof. Accordingly, the object detection and selection mechanism may take the form of an entirely hardware implementation, an entirely software implementation (including firmware, resident software, micro-code, etc.) or an implementation combining software and hardware aspects that may all generally be referred to herein as a "circuit," "module" or "system." Furthermore, the object detection and selection mechanism may take the form of a computer program product implemented in any tangible medium of expression having computer usable program code implemented in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code implemented therewith, either in baseband or as part of a carrier wave. The computer usable program code may be transmitted using any appropriate medium, including but not limited to wireless, wireline, optical fiber cable, RF, etc.

Computer program code for carrying out operations of the object detection and selection mechanism may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The object detection and selection mechanism is described below with reference to flowchart illustrations and/or block diagrams of methods, apparatus (systems) and computer program products according to implementations thereof. It will be understood that each block of the flowchart illustrations and/or block diagrams, and combinations of blocks in the flowchart illustrations and/or block diagrams, can be implemented or supported by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It is noted that computer programs implementing the object detection and selection mechanism can be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this mechanism. All these operations are well-known to those skilled in the art of computer systems.

The flowchart and block diagrams in the Figures illustrate the architecture, functionality, and operation of possible implementations of systems, methods and computer program products according to various implementations of the object detection and selection mechanism. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or by combinations of special purpose hardware and computer instructions.

The term "pixel," short for "picture element," is used herein with different meanings, depending on the context: an image sensor, a display module, or a digital representation of an image. In the context of a digital representation of an image, a pixel is the smallest element of the digital representation of the image.

A digital camera module includes one or more lenses that are focusing light onto a photosensitive pixel array of the image sensor. The lenses and the pixel array form the optical setup of the camera module, and this optical setup may be adjustable by, for example, adjusting distances between a lens and the image sensor or among lenses, or by replacing one set of lenses with another. The optical setup at a particular moment defines the optical field of view of the camera module at that moment. The term "optical field of view" is defined as the part of the world that is visible to the pixel array of the image sensor via the optical setup.

The pixel array of an image sensor is an array of very fine electronic pixels arranged in horizontal rows and vertical columns. Such an image sensor, for example, a charge coupled device (CCD) or complementary metal oxide semiconductor (CMOS) image sensor, is capable of receiving and capturing radiant energy, and converting the radiant energy into electronic signals that become a virtual representation of an optical image. When digital camera functionality is described as a two-megapixel, three-megapixel or five-megapixel, this is an approximate description of the number of pixels in the image sensor's pixel array. The term "captured image" refers to the image read from the pixel array, discounting any margin or border pixels. For example, a two-megapixel digital camera may produce a captured image of 1600 by 1200 pixels.

A host device in which digital camera functionality is integrated typically includes a display module to display a "preview image" that is derived from the captured image. Looking at the preview image may assist a user of the host device in taking a photograph using the digital camera functionality, since the preview image provides the user with visual feedback as to what the digital camera "sees". The display module includes a pixel array, which is an array of pixels arranged in horizontal rows and vertical columns. Depending on the technology for the pixel array, the pixels may comprise photo-emitting material, or may by controllable, as in liquid crystal display (LCD) technology, to block light or permit the transmission of light in varying degrees. Other technologies for pixel arrays in display modules are known in the art. The number of pixels in a pixel array of the display module is typically smaller than the number of pixels in the captured image. For example, a display may have 320 by 240 pixels.

As known in the art, the term "color temperature" is a characteristic of visible light. The color temperature of a light source is determined by comparing its chromaticity with that of an ideal black-body radiator. The temperature at which the heated black-body radiator matches the color of the light source is that source's color temperature. A low color temperature shifts light toward the red and a high color temperature shifts light toward the blue. Different light sources emit light at different color temperatures. For that reason, pictures may turn out with a yellow/orange cast in incandescent (tungsten) lighting and bluish in fluorescent lighting. Physical filters can be used to correct for incandescent or fluorescent lighting. In digital photography, if a camera "knows" which object is white and supposed to come out white in the picture, the camera can calculate the difference between the current color temperature of that object and the correct color temperature of a white object and then shift the colors in the image by that difference. AWB may be done in many different ways. In one example, an algorithm in the camera searches the image for the lightest area and assumes this is white. This area is then used to color balance the entire image.

Exposure is the total amount of light allowed to fall on an image sensor during the process of taking a photograph. "Correct" exposure may be defined in some instances as an exposure that achieves the effect the photographer intended. The purpose of exposure adjustment (in combination with lighting adjustment) is to control the amount of light from the subject that is allowed to fall on the image sensor, so to yield a "correct" or acceptable exposure. A photograph may be described as overexposed when it has a loss of highlight detail, that is, when the bright parts of an image are effectively all white, known as "blown out highlights" (or "clipped whites"). A photograph may be described as underexposed when it has a loss of shadow detail, that is, the dark areas indistinguishable from black, known as "blocked up shadows" (or sometimes "crushed shadows, "crushed blacks," or "clipped blacks,"). A camera in "automatic exposure" (AE) mode may automatically calculate and adjust exposure settings in order to match (as closely as possible) the subject's mid-tone to the mid-tone of the photograph.

"Autofocus" is a feature of an optical system that allows it to obtain and sometimes continuously maintain focus on a subject. Sensors are used to collect data and the data is used to control electromechanical system that adjusts the focus of the optical system. With Passive Auto Focus, analysis is performed on the image captured by the image sensor and/or other sensors to achieve phase detection or contrast measurement. With Active Auto Focus, distance to the subject may be measured independently of the optical system, for example, using ultrasonic sound waves, Laser light and/or infrared light. Transmitters and receivers needed for active auto focusing may optionally be embedded within the optical system.

The definition of "face detection" and "face localization" tasks may have many variations on a general theme. As a non limiting example, the goal of face detection may be defined as to determine whether or not there are any faces in an arbitrary image and, if present, return the image location and extent of each face. Face detection can be regarded as a specific case of object-class detection. Face detection can be regarded as a more general case of face localization, in which the number of faces in the images is known.

Digital Camera Devices

In devices having digital camera functionality, face localization or detection assists the camera module in focusing, exposure and white balance (also known as 3A). Typically, in simple implementations, the center-most/largest face in a picture is used as the reference for 3A. The default selection, however, may not be the user's desired selection. It is desirable for the camera device to provide a means for the user to modify the default selection. In more advanced implementations, the user can select a face-of-interest from a crowd to perform 3A on.

One solution is to have a user select an object using a pointing device such as a track ball. Another solution is to have a user select an object using a touch screen. While the second solution is likely easier for the user, it requires touching and manipulating the device while the photographer or user is attempting to position their shot. As well, the screen of most electronic devices is relatively small and for an image of a large crowd, it may be difficult to precisely select a face. Note that it is assumed that when the user is taking a picture, they are holding the camera near to their body at eye level, or near to it (about 15-30 cm).

A third solution is to have a user select an object using gesture recognition whereby the user extends their arm and/or hand into the field of view and points their finger at a specific object (e.g., face-of-interest). Their arm appears in the viewfinder and an object detection and selection algorithm detects that the user/photographer has pointed at the face-of-interest. In this manner, the electronic device is never touched directly to select a face, and is thus a more natural way of operating/selecting. In addition, the gesture recognition method can be used in other applications such as selecting a point-of interest (POI) to focus on, or for later recall and/or processing (i.e. a house inspector points to a crack in the wall when taking a photo, the point could be recorded in metadata and brought back when the photo is unloaded from the device).

A diagram illustrating a sample image to be captured by a digital camera indicating the default object selected by the camera is shown in FIG. 1. The image 10 comprises several subjects (face objects in this example) 12, 14, 16 as detected by the camera. Under normal circumstances the biggest and closest face is selected by default as indicated by the bold box 12.

Figure 2:
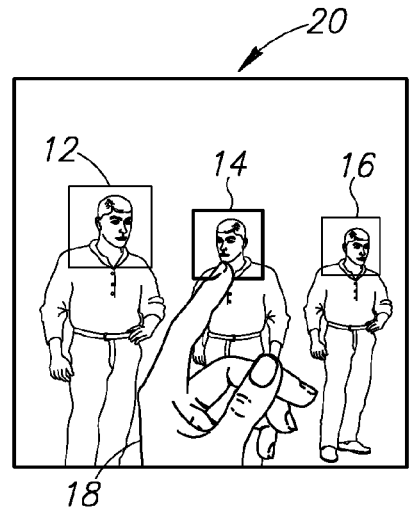

A diagram illustrating finger gesturing by a user to indicate which object the camera should focus on is shown in FIG. 2. In this image 20, the user wishes to select a specific face, different from that of the default one chosen by the camera. To do this, the user raises their arm and points using, for example, a finger 18 at the subject of interest or point of interest (i.e. the desired face) and holds the position until the camera or device locks onto the selection, such as via an audible or visible indication. The new face selection is indicated to the user via the bold box switching from 12 to 14.

Figure 3:
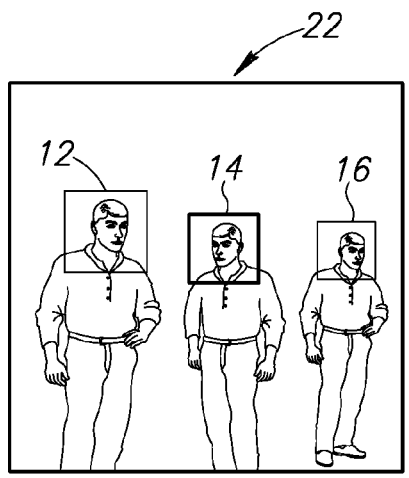
FIG. 3 is a diagram illustrating the selected object remains selected after removal of the user's hand.

A diagram illustrating the selected object remains selected after removal of the user's hand is shown in FIG. 3. In this image 22, the user has removed their hand but the selection 14 is maintained.

Figure 4:
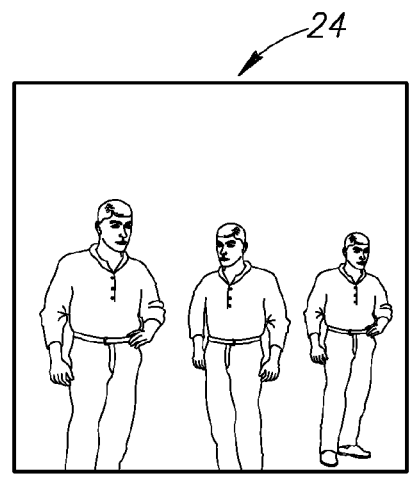
FIG. 4 is a diagram illustrating the actual picture taken by the camera.

A diagram illustrating the actual picture taken by the camera is shown in FIG. 4. In this image 24, the camera takes the picture with the focus on the person as indicated by bold box 14 in FIGS. 2 and 3.

Figure 5:
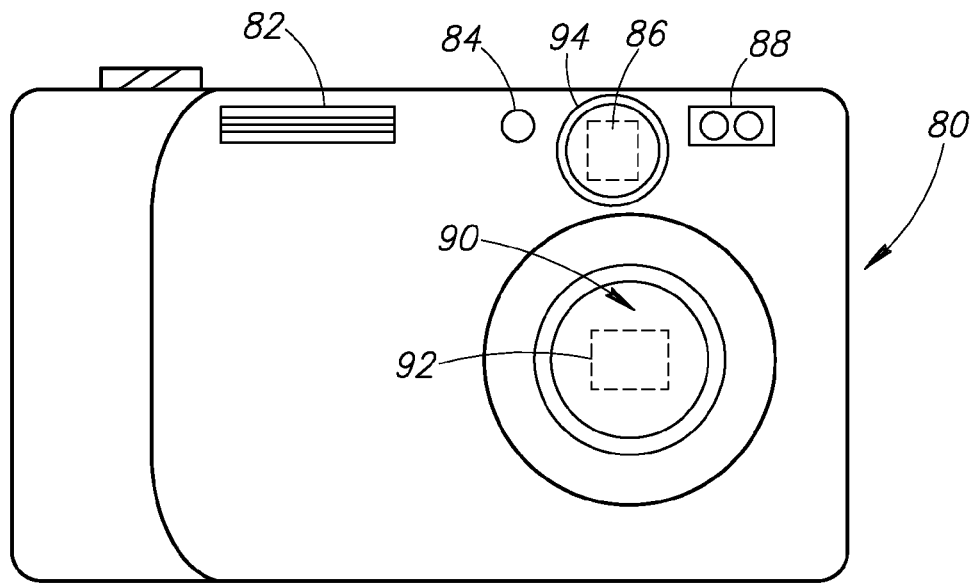
FIG. 5 is a is a front view of an example standalone digital camera incorporating the object selection mechanism.
Figure 6:
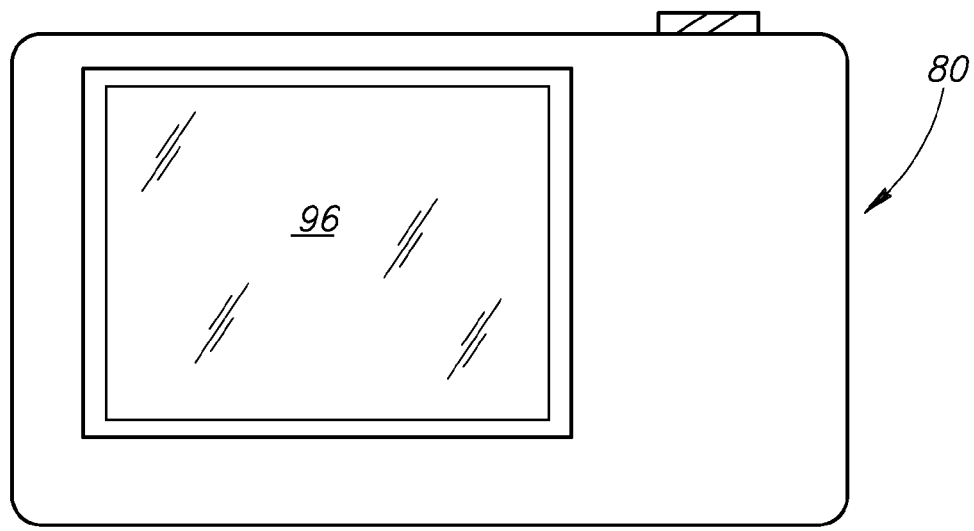
FIG. 6 is a is a rear view of an example standalone digital camera of FIG. 5.

A front view of an example standalone digital camera, generally referenced 80, incorporating the object selection mechanism is shown in FIG. 5. A rear view of the standalone digital camera 80 is shown in FIG. 6. Examples for standalone digital camera 80 includes, but is not limited to, a still camera, a Digital Single Lens Reflex (DSLR) camera, a video camera, a camcorder and the like. The camera 80 comprises a flash 82, lens 90, image sensor 92, IR LED 84, optional second lens 94, optional second image sensor (IR) 86 and one or more additional sensors 88. The lenses 90 and 94 may include one or more optical elements. Image sensor 92 is located inside standalone digital camera behind lens 90. IR image sensor 86 is located inside standalone digital camera behind lens 94. Optical elements of lenses 90, 94 may optionally be movable by a mechanical control element (not shown), for example, for the purpose of implementing autofocus functionality. Camera 80 optionally comprises flash 82 and one or more sensors 88.

The camera also comprises a display module 96. When camera 80 is operated, light focused by the lens 90 onto image sensor 92 results in the capture of an image by image sensor 92, and a preview image derived from the captured image is displayed by display module 96.

As described in more detail infra, the object selection mechanism can be implemented in camera 80 to provide gesture recognition and object selection.

Figure 7:
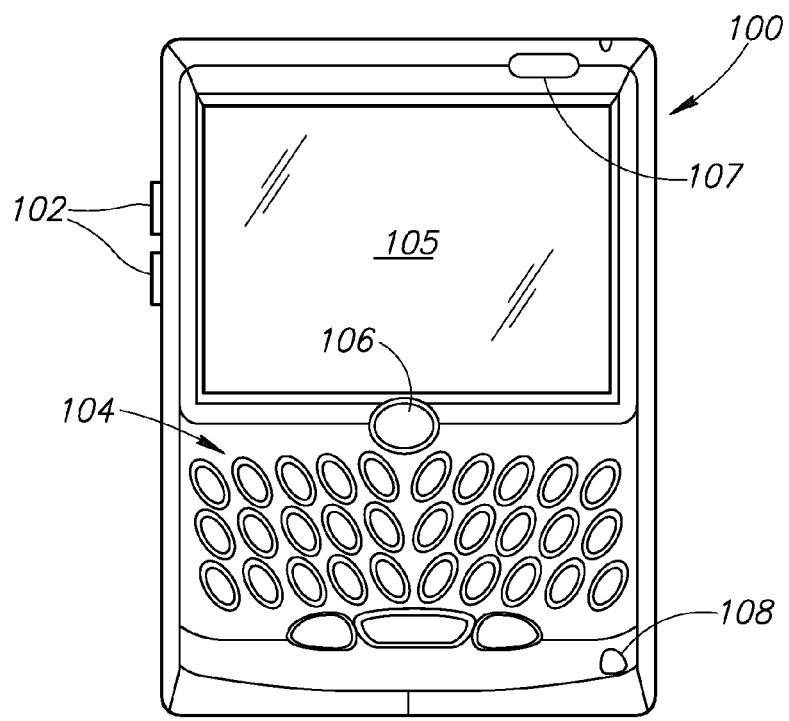
FIG. 7 is a front view of an example mobile electronic device incorporating digital camera functionality and the object selection mechanism.

A front view of an example mobile electronic device incorporating digital camera functionality and the object selection mechanism is shown in FIG. 7. The example electronic device is generally referenced 100. A non-exhaustive list of examples for the electronic device includes a personal digital assistant (PDA), a mobile phone, a smartphone, a handheld gaming device, a handheld media player, an electronic mail client, an instant messaging client, a netbook computer, a notebook computer, a laptop computer, a desktop computer and the like.

Electronic device 100 may be one device enclosed in one enclosure. Electronic device 100, however, may represent a "system", in which different components are connected together to form the system. As an example, a desktop computer may be such a system, having a flat panel display provided by one vendor and a camera provided by another vendor.

The device 100 comprises a display module 105 and various user input components including, for example, a keyboard 104, a trackball 106, buttons 102 and a microphone 108. If display module 105 comprises a touchscreen then display module 105 is also a user input component. Other user input components are also contemplated. Various user output components of mobile electronic device 100 are shown, including, for example, a speaker 107. Other user output components are also contemplated.

Figure 8:
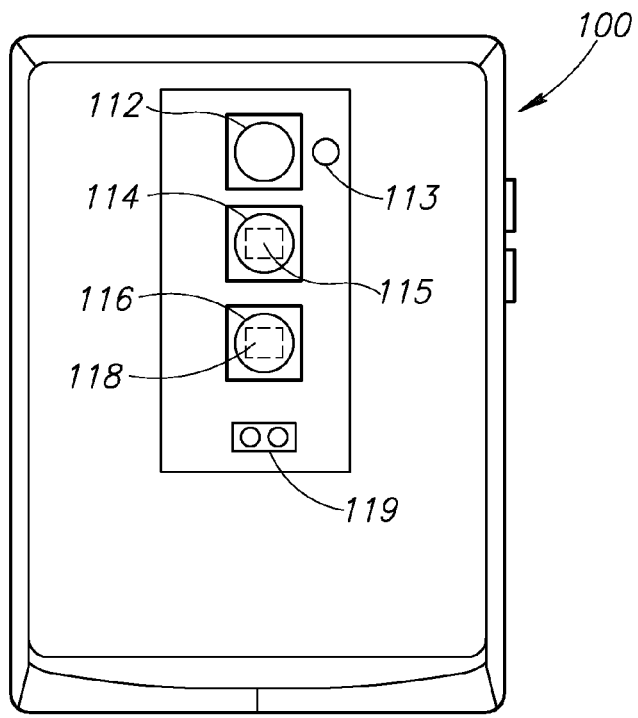
FIG. 8 is a rear view of the example mobile electronic device illustrated in FIG. 7.

A rear view of the example mobile electronic device illustrated in FIG. 7 is shown in FIG. 8. A flash 112, IR LED 113, lens 114, IR image sensor 115, lens 116, image sensor 118 and one or more other sensors 119. Each lens 114, 116 may include one or more optical elements. IR image sensor 115 is located inside the camera 100 behind lens 114. Image sensor 118 is located inside the camera 100 behind lens 116. Optical elements of lenses 114, 116 may optionally be movable by a mechanical control element (not shown) of device 100, for example, for the purpose of implementing autofocus functionality. When the digital camera functionality is operated, light focused by lens 116 onto image sensor 118 results in the capture of an image by image sensor 118, and a preview image related to the captured image is displayed by display module 105. Mobile electronic device 100 may optionally include one or more sensors 119.

Optical zoom capabilities may be available with standalone digital camera 80 or mobile electronic device 100 if a focal length of the arrangement of optical elements of lenses 90 and 116, respectively, can be changed, usually through mechanical means. Digital zoom capabilities are implemented electronically and may be available without the need for a change in the focal length of the arrangement of optical elements.

Digital zoom capabilities may be available with standalone digital camera 80 or mobile electronic device 100. Digital zoom is accomplished by cropping an image to retain a center part of the image with the same aspect ratio as the original and to discard the rest of the image. The retained portion is referred to herein as the cropped image, including cases where the entire image is retained. At a digital zoom level of 1×, no cropping is performed and the entire image is retained. The cropped image is therefore identical to the image before cropping. At a digital zoom level of 2×, about one quarter of the image is retained. At a digital zoom level of 3×, about one ninth of the image is retained.

Figure 18:
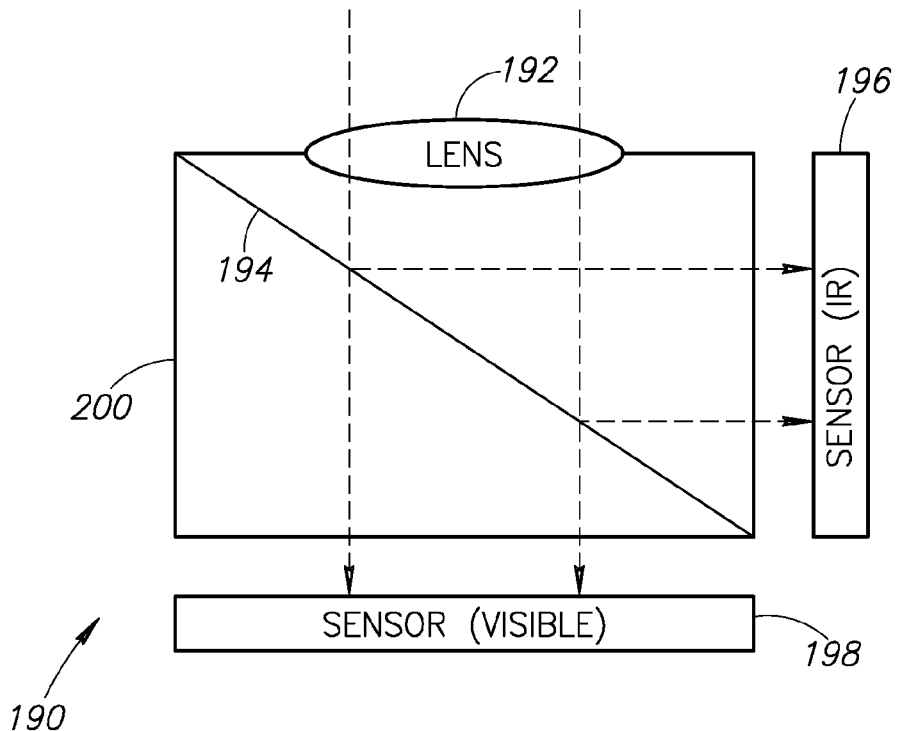
FIG. 18 is a diagram illustrating an example sensor module integrating both visible and IR light sensors.

A diagram illustrating an example sensor module implementation integrating both visible and IR light sensors is shown in FIG. 18. In this example sensor module, rather than utilize a separate lens and image sensor for visible light and for IR light, image sensors for both visible and IR light are integrated into a single sensor module. In particular, the sensor module, generally referenced 190, comprises a housing or body 200, lens 192, reflective IR filter 194, visible light image sensor 198 and IR light image sensor 196. Note that reflective IR filter 194 is mounted in the body 200 at a 45 degree angle in a beam splitter arrangement operative to reflect IR light onto the IR sensor 196 while allowing visible light to pass the filter and illuminate visible light image sensor 198. This dual sensor configuration does not require any registration or transformations on the final data because both visible and IR sensors simultaneously view the same scene in the same perspective.

Mobile Communications Device Implementation

Figure 9:
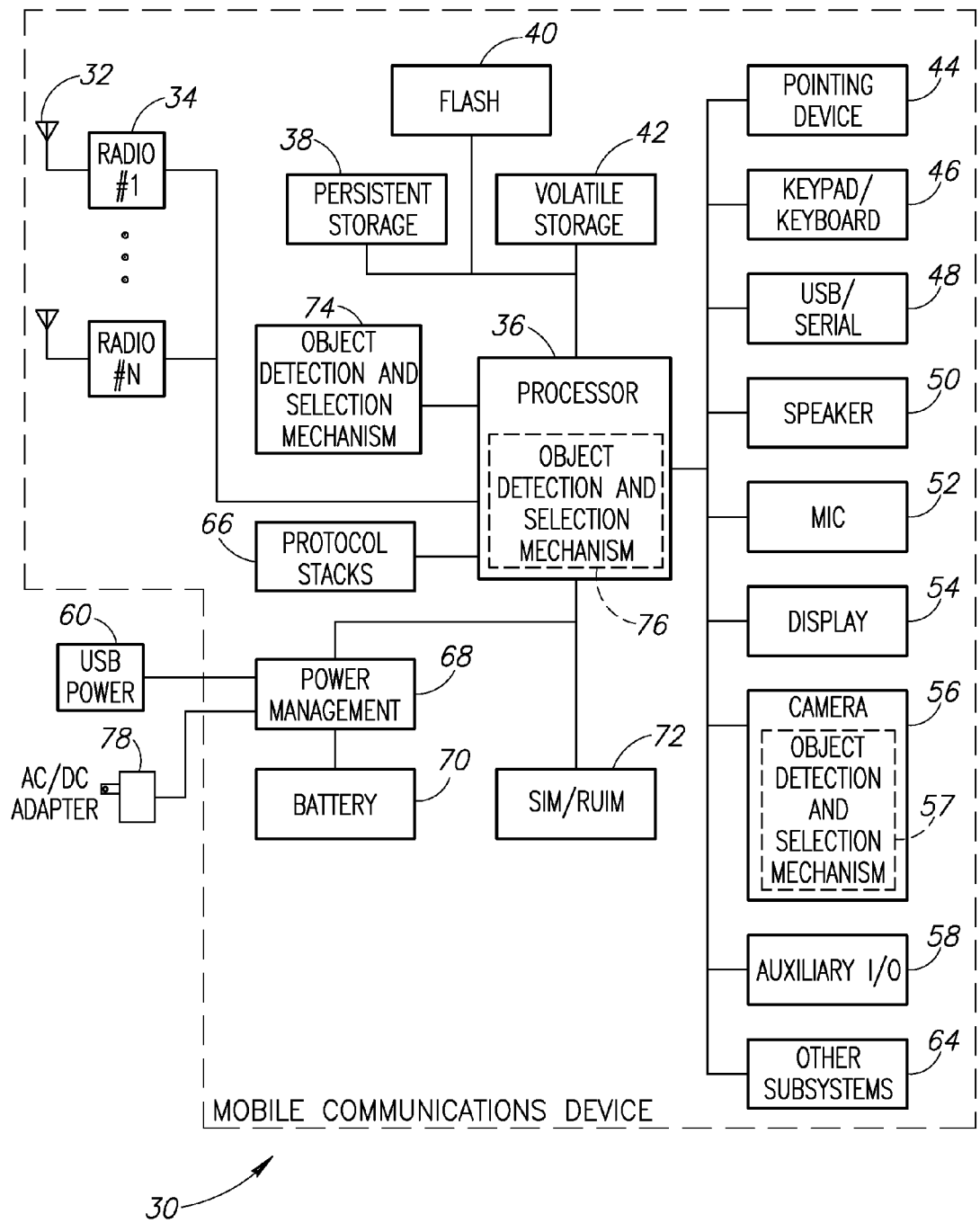
FIG. 9 is a block diagram illustrating an example wireless communication device incorporating the object detection and selection mechanism.

A block diagram illustrating an example mobile communication device incorporating the object selection mechanism is shown in FIG. 9. The mobile communication device is preferably a two-way communication device having voice and data communication capabilities. In addition, the device optionally has the capability to communicate with other computer systems via the Internet. Note that the mobile communications device (or mobile device) may comprise any suitable wired or wireless device such as multimedia player, mobile communication device, cellular phone, smartphone, PDA, PNA, Bluetooth device, etc. For illustration purposes only, the device is shown as a mobile device, such as a cellular based smartphone. Note that this example is not intended to limit the scope of the mechanism as the object selection mechanism can be implemented in a wide variety of communication devices. It is further appreciated the mobile device 30 shown is intentionally simplified to illustrate only certain components, as the mobile device may comprise other components and subsystems 64 beyond those shown.

The mobile device, generally referenced 30, comprises a processor 36 which may comprise a baseband processor, CPU, microprocessor, DSP, etc., optionally having both analog and digital portions. The mobile device may comprise a plurality of radios 34 and associated antennas 32. Radios for the basic cellular link and any number of other wireless standards and Radio Access Technologies (RATs) may be included. Examples include, but are not limited to, Global System for Mobile Communication (GSM)/GPRS/EDGE 3G; WCDMA; WiMAX for providing WiMAX wireless connectivity when within the range of a WiMAX wireless network; Bluetooth for providing Bluetooth wireless connectivity when within the range of a Bluetooth wireless network; WLAN for providing wireless connectivity when in a hot spot or within the range of an ad hoc, infrastructure or mesh based wireless LAN (WLAN) network; near field communications; UWB; GPS receiver for receiving GPS radio signals transmitted from one or more orbiting GPS satellites, FM transceiver provides the user the ability to listen to FM broadcasts as well as the ability to transmit audio over an unused FM station at low power, such as for playback over a car or home stereo system having an FM receiver, digital broadcast television, etc. The mobile device also comprises protocol stacks 66, which may or may not be entirely or partially implemented in the processor 36. The protocol stacks implemented will depend on the particular wireless protocols required.

The mobile device may also comprise internal volatile storage 42 (e.g., RAM) and persistence storage 38 (e.g., ROM) and flash memory 40. Persistent storage 38 also stores applications executable by processor 36 including the related data files used by those applications to allow device 30 to perform its intended functions. Several user-interface devices include trackball/thumbwheel 44 which may comprise a depressible thumbwheel/trackball that is used for navigation, selection of menu choices and confirmation of action, keypad/keyboard 46 such as arranged in QWERTY fashion for entering alphanumeric data and a numeric keypad for entering dialing digits and for other controls and inputs (the keyboard may also contain symbol, function and command keys such as a phone send/end key, a menu key and an escape key), microphone(s) 52, speaker(s) 50 and associated audio codec or other multimedia codecs, vibrator (not shown) for alerting a user, camera and related circuitry 56, display(s) 54 and associated display controller. A serial/USB or other interface connection 48 (e.g., SPI, SDIO, PCI, USD, etc.) provides a serial link to a user's PC or other device. SIM/RUIM card 72 provides the interface to a user's SIM or RUIM card for storing user data such as address book entries, user identification, etc.

Portable power is provided by the battery 70 coupled to power management circuitry 68. External power is provided via USB power 60 or an AC/DC adapter 78 connected to the power management circuitry 68 which is operative to manage the charging and discharging of the battery 70.

The mobile communications device is also adapted to implement the object detection and selection mechanism 74. Alternatively (or in addition to), the object detection and selection mechanism may be implemented as (1) a task 74 stored in external memory executed by the processor 36, (2) as a task 76 executed from memory embedded in processor 36, or (3) hardware/software 57 within camera block 56. The object detection and selection task blocks 74, 76, 57 are adapted to implement the object detection and selection mechanism as described in more detail infra. Note that the object detection and selection mechanism may be implemented as hardware, software or as a combination of hardware and software. Implemented as a software task, the program code operative to implement the object detection and selection mechanism is stored in one or more memories 38, 40, 42 or local memories within the processor 36.

Host Device

Figure 10:
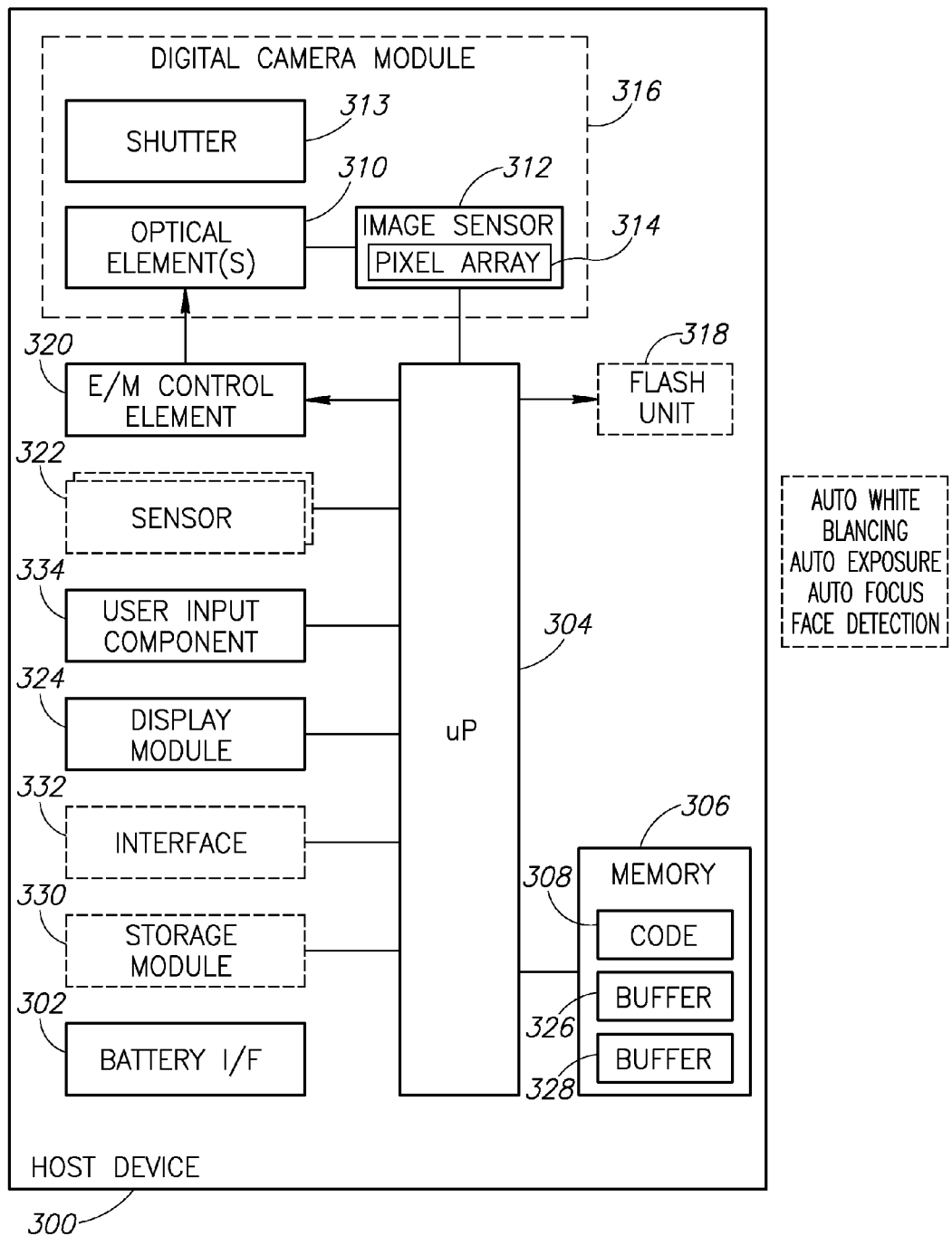
FIG. 10 is a simplified block diagram illustrating an example host device in which digital camera functionality is integrated.

A simplified block diagram illustrating an example host device in which digital camera functionality is integrated is shown in FIG. 10. Standalone digital camera 80 and mobile electronic device 100 are both examples of a host device such as illustrated in FIG. 10, and other host devices are also contemplated. Host device 300 may comprise components, elements, circuitry and/or modules that, for clarity, are not illustrated in FIG. 10. Host device 300 may be battery-operated and comprises a battery interface 302 through which a battery (not shown) can power components of host device 300.

Host device 300 comprises a processor 304 and a memory 306, coupled to processor 304. Memory 306 may comprise removable memory or non-removable memory or any combination thereof. Memory 306 may comprise volatile memory or non-volatile memory or any combination thereof. Memory 306 is an example of physical computer-readable media.

Memory 306 is arranged to store code 308 that is executable by processor 304. Code 308 may comprise firmware or software or any combination thereof. Code 308 may include an operating system for host device 300 and applications to be run on host device 300. Code 308, when executed by processor 304, may cause host device 300 to perform any of the methods described herein. It should be understood that processor 304 is representative of any actual number of processors in host device 300.

Host device 300 comprises an arrangement 310 of one or more optical elements, and an image sensor 312 optically coupled to arrangement 310. Image sensor 312 comprises a pixel array 314 comprising photosensitive material. Image sensor 312 is arranged to read a captured image from pixel array 314. The actual size of the image read from pixel array 314 will depend on the number of pixels in pixel array 314 and the sensor mode in which image sensor 312 is operated. Ultra eXtended Graphics Array (UXGA) and Super Video Graphics Array (SVGA) are two examples for a sensor mode. As mentioned above, the term captured image refers to the image read from the pixel array, discounting any margin or border pixels. For example, an image sensor comprising a pixel array of dimensions 1624 by 1216 and operated in a UXGA mode may read an image of 1608 by 1208 pixels. With a margin of four dummy columns along each edge of the image, the dimensions of the captured image are therefore 1600 by 1200 pixels.

Image sensor 312 and arrangement 310 and optionally a shutter 313 may be packaged together as a digital camera module 316. A non-exhaustive list of examples for image sensor 312 includes a charge coupled device (CCD) image sensor and a complementary metal oxide semiconductor (CMOS) image sensor. Image sensor 312 may include processing capabilities. For example, image sensor 312 may be a system-on-chip (SOC) image sensor. Alternately, image sensor 312 may lack processing capabilities.

Host device 304 may optionally include a flash unit 318, representative of flash 106 and flash 216. Flash unit 318 may be controllable by processor 304 to discharge a flash of light in synchronization with capturing an image using image sensor 312. The amount of light to be discharged by flash unit 318 may be controllable by processor 304.

Host device 304 may optionally include an electromechanical element 320, such as a motor or an actuator, mechanically coupled to optical elements of arrangement 310. Electromechanical element 320 may be controllable by processor 304 to adjust positions of optical elements of arrangement 310 and to effect focusing and optionally other characteristics of arrangement 310.

Host device 304 may optionally include one or more sensors 322 to be used in conjunction of capturing images by host device 300. Any of sensors 322 may be, for example, an optical autofocus sensor, an exposure meter, a pair of an ultrasonic transmitter and an ultrasonic receiver, a pair of an infrared transmitter and an infrared receiver, a pair of a laser transmitter and an optical receiver, and any other sensor as known in the art. Sensors 322 may be able to provide measurements indicative of distance to objects, ambient light conditions and any other parameters useful in conjunction to capturing images at host device 300. Any of sensors 322 may be located inside or outside of digital camera module 316 and even behind optical elements of arrangement 310. Pixel array 314 may optionally function as one of sensors 322 to provide measurement useful for adjusting focus, exposure, white balancing and so on.

Host device 304 includes a display module 324 coupled to processor 304. A non-exhaustive list of examples for an element comprised in display module 324 includes an active matrix, a passive matrix, a thin film transistor (TFT) liquid crystal display (LCD), a thin film diode (TFD) LCD, an organic light emitting diode (OLED), a capacitive touchscreen, a resistive touchscreen, a twisted nematic (TN) display, a super-twisted nematic (STN) display, and the following types of STN displays: color STN (CSTN), double layer STN (DSTN), dual scan STN (DSTN), fast response STN (FRSTN), film compensated STN (FSTN), double film STN (FFSTN), and monochrome STN (MSTN).

Although display module 324 is illustrated in FIG. 10 as comprised in host device 300, in other implementations, display module 324 may be external to host device 300 and host device 300 may comprise an interface (not shown) through which display module 324 can receive input from host device 300.

Memory 306 may comprise a buffer 326 and a buffer 328. Buffer 326 is arranged to store a recordable image that is to be recorded in a storage medium. Buffer 328 is arranged to store a preview image to be displayed by display module 324. Both the recordable image and the preview image are derived from the captured image.

The storage medium to which a recordable image stored in buffer 326 is to be recorded may be comprised in host device 300, illustrated in FIG. 10 as an optional block 330. Alternatively or additionally, the storage medium to which a recordable image stored in buffer 326 is to be recorded may be external to host device 300. Recording of the image in the external storage medium (not shown) may be enabled using an interface of host device 300, illustrated in FIG. 10 as an optional block 332. A non-exhaustive list of examples for interface 332 includes a radio-frequency wireless communication interface, a wired communication interface, a universal serial bus (USB) connector, and an optical interface.

Host device 300 comprises one or more user input components 334 coupled to processor 304. A non-exhaustive list of examples for user input components 334 includes a trackball, a thumbwheel, a key, a button, a keyboard, a touchscreen, an optical user input component, and an audio user input component such as a microphone. Host device 300 may be able to operate pixel array 314 as a user input component and therefore pixel array 306 may be considered as one of user input components 334.

Image Sensor

Figure 11:
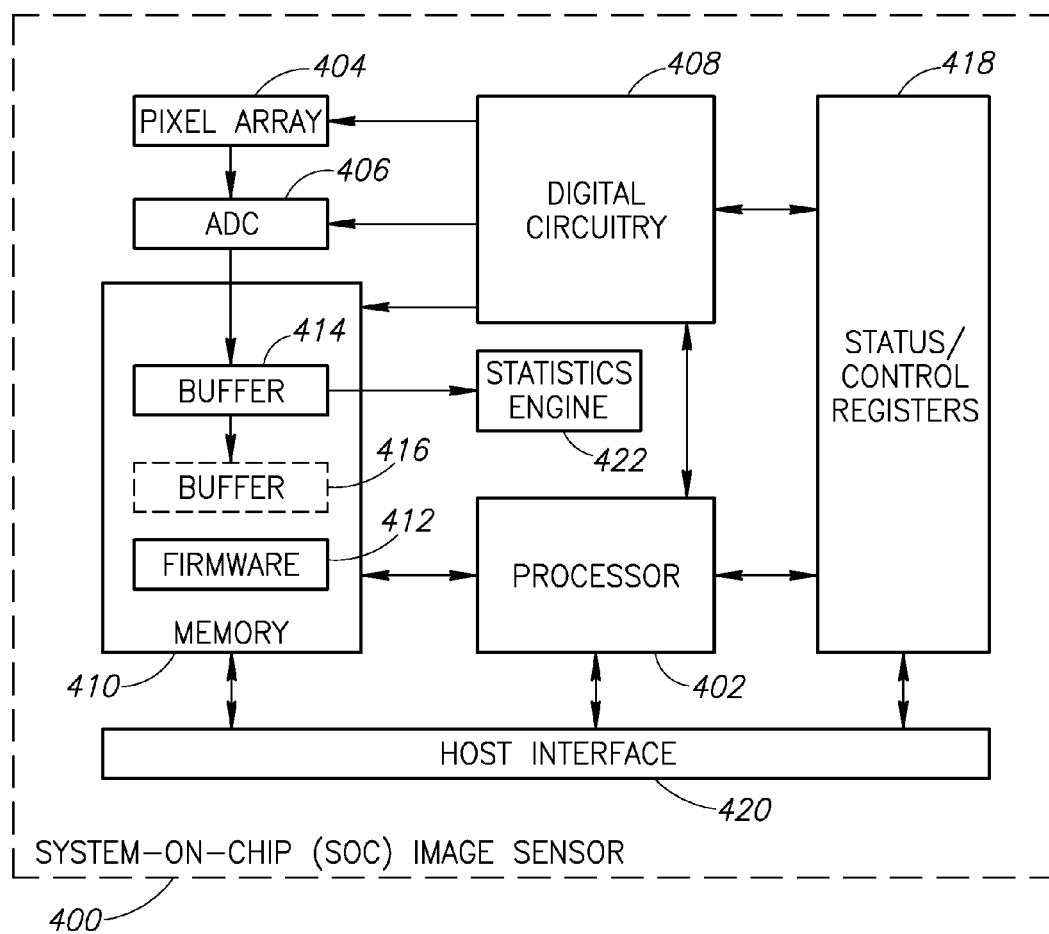
FIG. 11 is a simplified block diagram illustrating an example system-on-chip image sensor.

A simplified block diagram illustrating an example system-on-chip image sensor is shown in FIG. 11. Image sensor 400, which is an example of image sensor 312, may comprise components, elements, circuitry and/or modules that, for clarity, are not illustrated in FIG. 11. Image sensor 400, being a system-on-chip image sensor, is a single integrated circuit and necessarily comprises a processor 402. Image sensor 400 comprises a pixel array 404 comprising photosensitive material. Image sensor 400 is arranged to read a captured image from pixel array 404.

Image sensor 400 comprises an analog-to-digital converter (ADC) 406 to convert analog output of pixel array 404 to digital output. Image sensor 400 comprises digital circuitry 408 coupled to pixel array 404 and to processor 402. Digital circuitry 408 comprises digital control circuitry that directly controls the operation of pixel array 404, since digital circuitry 408 may be able to operate faster than processor 402.

Image sensor 400 comprises a memory 410 coupled to processor 402. Firmware 412 of processor 402 may be stored in memory 410. Memory 410 comprises a buffer 414 in which the digital output of ADC 406 is stored.

As described herein, some implementations of image sensor 400 may be able to output two different images, for example, a cropped image and a preview image. For at least this reason, image sensor 400 may comprise another buffer, illustrated in FIG. 11 as optional block 416. All or part of the contents of buffer 414 may be copied to buffer 416 so that image sensor 400 is able to process the contents of buffer 416 independently of the contents of buffer 414.

The contents of buffer 414 and optional buffer 416 may be operated on by firmware 412 when executed by processor 402, or by one or more portions of digital circuitry 408, or by both. Digital circuitry 408 may have non-control functionality implemented therein. A non-exhaustive list of such non-control functionality includes cropping, zooming, derating, panning, conversion of color format and any combination thereof. At least one of firmware 412 when executed by processor 402 and digital circuitry 408 operates on buffer 416.

Image sensor 400 comprises one or more status/control registers 418 to affect operation of digital circuitry 408 and processor 402. For example, any programmable or configurable parameters of image sensor 400, such as sensor mode, output dimensions, preview image sharpness, and whether image sensor 400 generates the preview image, may be stored in status/control registers 418.

Image sensor 400 comprises a host interface 420 coupled to memory 410 to output contents of buffer 414 and optional buffer 416 using Direct Memory Access (DMA), and coupled to the one or more status/control registers 418 to enable reading and writing to the one or more status/control registers 418. Host interface 420 may optionally be coupled to processor 402.

Image sensor 400 comprises a statistics engine 422 to gather real-time statistical information about images stored in buffer 414. The statistical information is available to processor 420 that may use it to perform real-time image control tasks.

In one example, processor 402 may use the statistical information in calculating exposure setting for a scene so that image sensor 400 would output a correctly exposed image. The setting may include a combination of exposure control analog gain for pixel array 404 and/or ADC 406 and digital gain.

In another example, processor 402 may use the statistical information in calculating gain adjustments to individual colors in an image in order to achieve a desired white balancing.

Digital Camera and Display Modules

Figure 12:
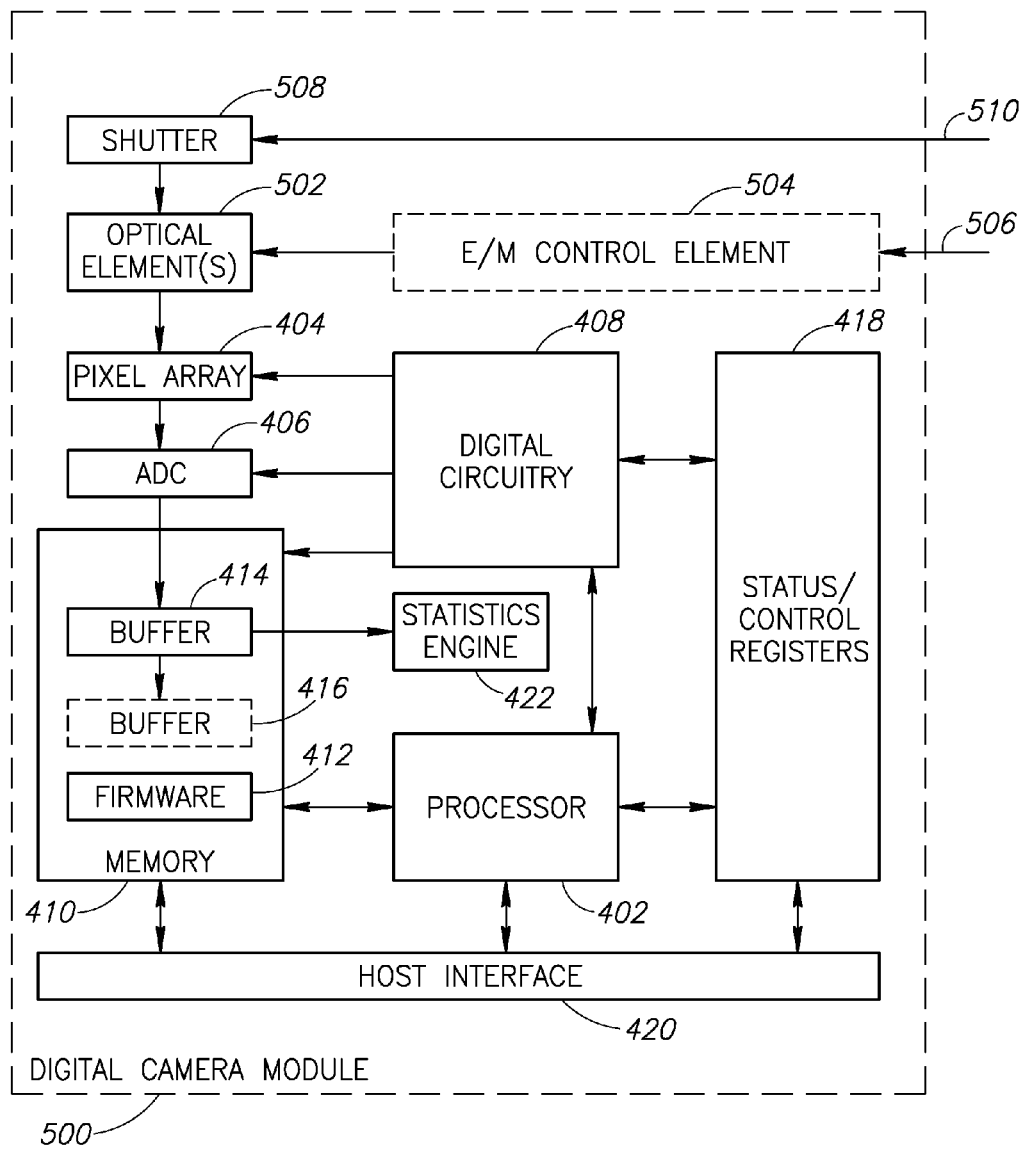
FIG. 12 is a simplified block diagram illustrating an example digital camera module.

A simplified block diagram illustrating an example digital camera module is shown in FIG. 12. Digital camera module 500, which is an example of digital camera module 316, may comprise components, elements, circuitry and/or modules that, for clarity, are not illustrated in FIG. 12. Digital camera module 500 comprises an arrangement 502 of one or more optical elements. A non-exhaustive list of examples for an optical element in arrangement 310 of FIG. 3 or arrangement 502 in FIG. 12 includes lens, collimator, filter, and polarizer.

Digital camera module 500 comprises processor 402, pixel array 404, ADC 406, digital circuitry 408, memory 414, status/control registers 418, host interface 420 and statistics engine 422 all of which have been described with respect to FIG. 12. Memory 410 comprises buffer 414 and may optionally comprise buffer 416. Firmware 412 may be stored in memory 410. Digital camera module 500 may be enclosed in a housing (not shown) such that arrangement 502 of one or more optical elements is exposed or exposable, for example, by opening a shutter (not shown), to radiant energy, and such that host interface 420 is accessible.

Digital camera module 500 may optionally include an electromechanical control element 504, such as electromechanical control element 320 of FIG. 10, controllable to mechanically move optical elements of arrangement 502. In this case, arrow 506 represents control signals from outside of digital camera module 500 to control operation of electromechanical control element 504. In an alternative option, digital camera module 500 does not include an electromechanical control element and arrow 506 represents a mechanical interface to an electromechanical control element. It should be noted that optical elements of digital camera module 500 may not be movable at all.

Digital camera module 500 may optionally include a shutter 508 to control exposure of pixel array 404, and a mechanical or electrical control interface 510 to shutter 508.

Figure 13:
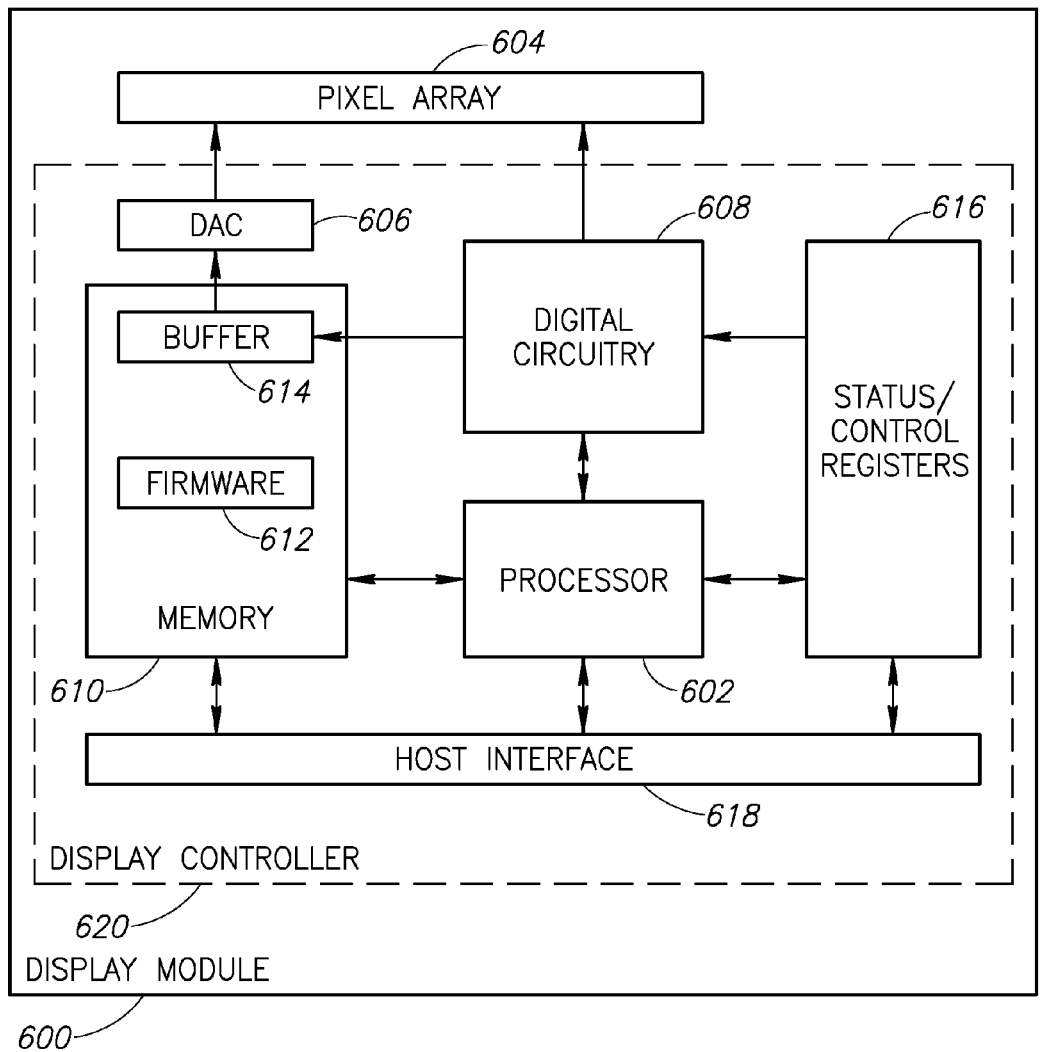
FIG. 13 is a simplified block diagram illustrating an example display module.

A simplified block diagram illustrating an example display module is shown in FIG. 13. Display module 600, which is an example of display module 324, may comprise components, elements, circuitry and/or modules that, for clarity, are not illustrated in FIG. 13. Display module 600 comprises a processor 602. Display module 600 comprises a pixel array 604. Depending on the technology for pixel array 604, the pixels may comprise photo-emitting material, or may by controllable, as in LCD technology, to block light or permit the transmission of light in varying degrees. Other technologies for pixel arrays in display modules are known in the art.

Display module 600 comprises a digital-to-analog converter (DAC) 606 to convert digital representations of images to analog input for pixel array 604. Display module 600 comprises digital circuitry 608 coupled to pixel array 604 and to processor 602. Digital circuitry 608 directly controls the operation of pixel array 604, since digital circuitry 608 may be able to operate faster than processor 602.

Display module 600 comprises a memory 610 coupled to processor 602. Firmware 612 of processor 602 may be stored in memory 610. Memory 610 comprises a buffer 614 in which the digital input to DAC 606 is stored.

The contents of buffer 614 may be operated on by firmware 612 when executed by processor 602, or by one or more portions of digital circuitry 608, or by both.

Display module 600 comprises one or more status/control registers 616 to affect operation of digital circuitry 608 and processor 602. For example, whether display module 600 is being operated in full-screen mode or in a smaller screen mode, may be stored in status/control registers 618.

Display module 600 comprises a host interface 618 coupled to memory 610 for input of the contents of buffer 614 using DMA, and coupled to status/control registers 616 to enable reading and writing to the one or more of status/control registers 616. Host interface 618 may optionally be coupled to processor 602.

In one example, elements illustrated in FIG. 13 other than pixel array 604 may be packaged as a single component, known as a display controller 620. Display module 614 may then comprise pixel array 604 and display controller 620.

Object Detection and Selection Mechanism

Figure 14:
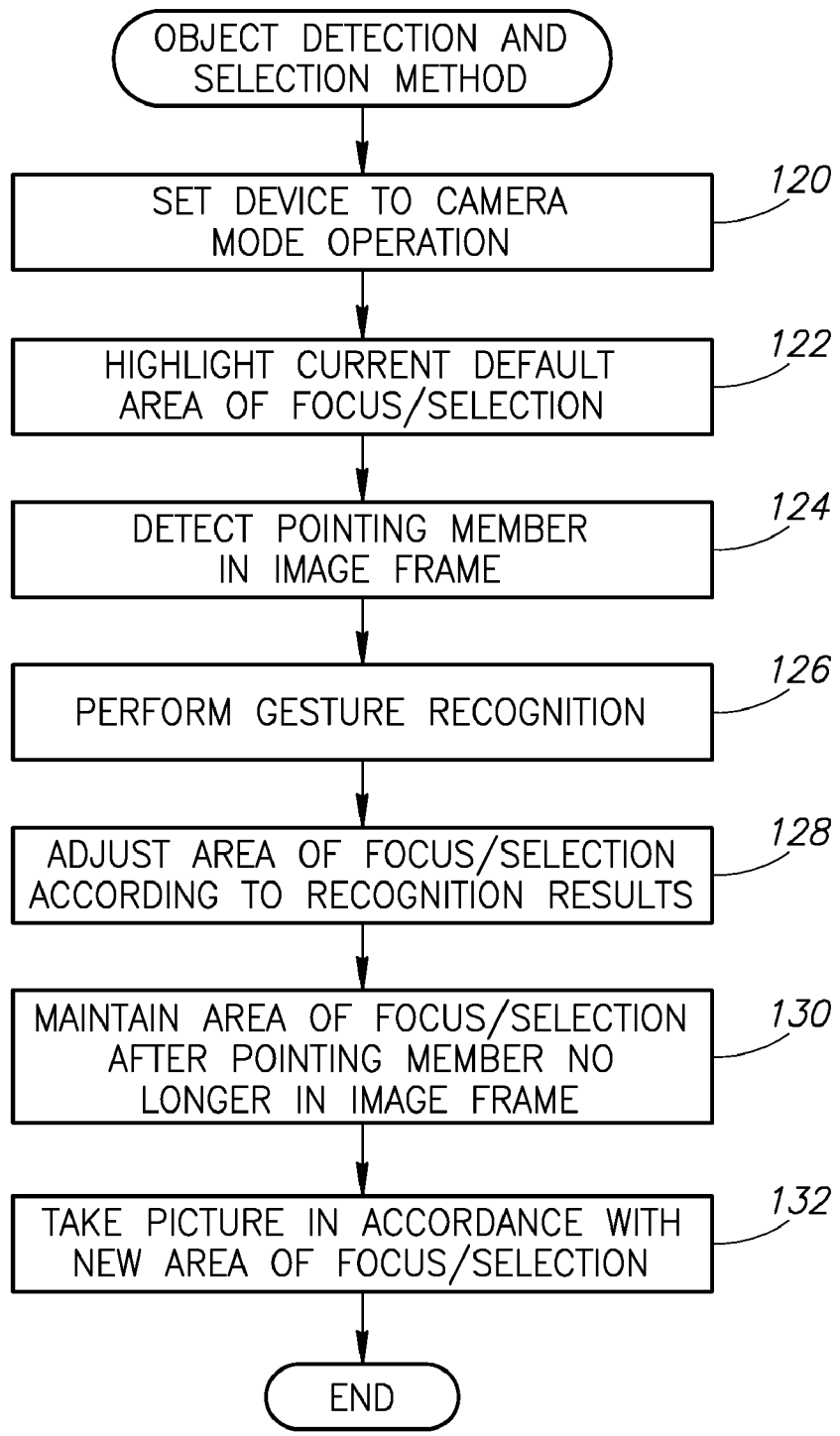
FIG. 14 is a flow diagram illustrating an example object detection and selection method.

A flow diagram illustrating an example object detection and selection method is shown in FIG. 14. The mechanism is operative when the device is set to camera mode of operation (step 120). If the camera has face recognition capabilities, the area of focus currently set as the default is displayed (step 122). Otherwise, the camera displays the current area of focus if face recognition is absent or not turned on. At this point, the user desires to change the focus selection to another face/area. To achieve this, the user gestures with their hand or finger (pointing member) or other object to point to the desired face/area of focus desired. The gesture, however, must be made within the field of view of the IR camera lens. The mechanism detects the pointing member in the image frame (step 124).

Once a gesture is detected, the mechanism performs gesture recognition whereby the face/area of focus pointed to by the pointing member is determined (step 126). Once a new face/area of focus is determined, the camera sets the current face/area of focus to that determined by gesture recognition (step 128). This new face/area of focus selection remains after the user withdraws the pointing member (i.e. it is no longer in the image frame) (step 130). The user then takes the picture in accordance with the new face/area of focus selection (step 132).

Figure 15:
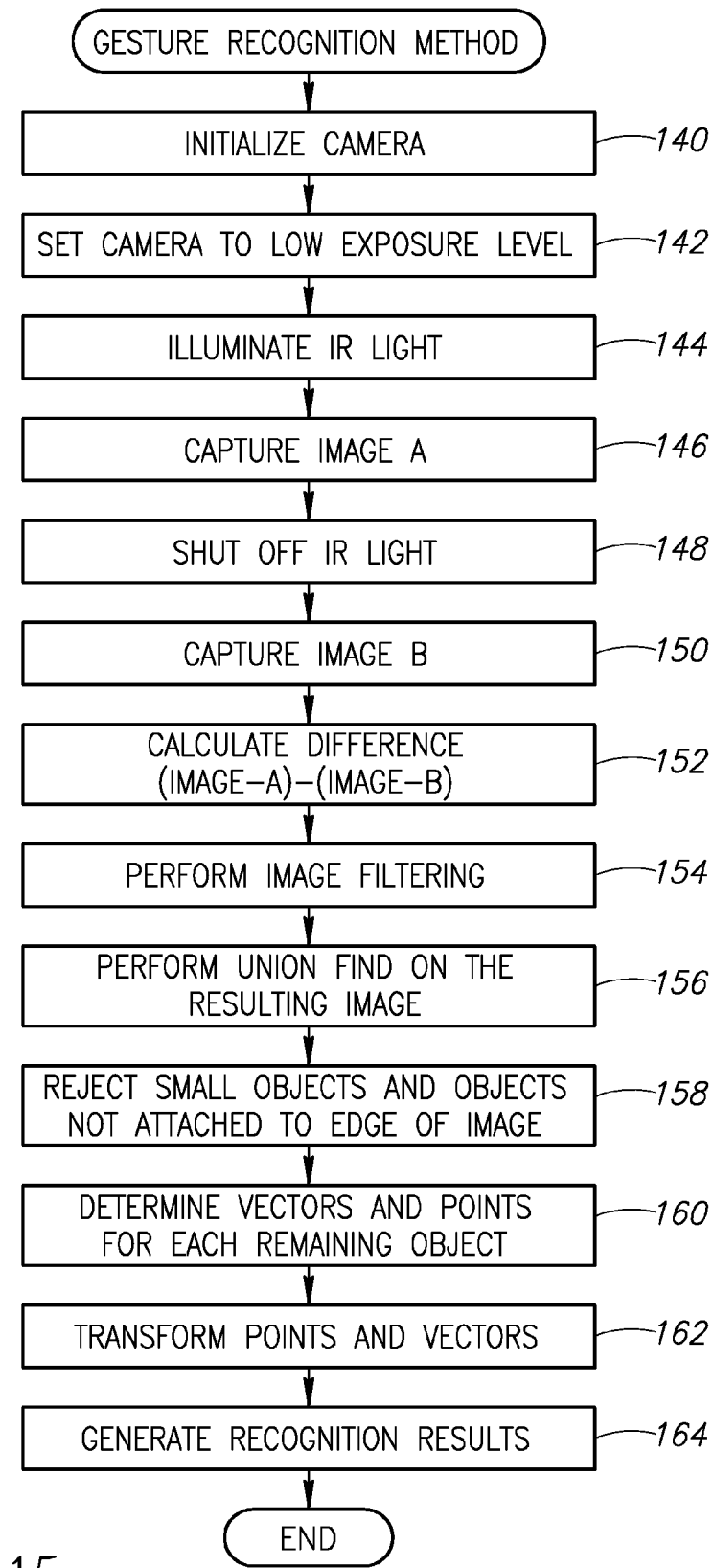
FIG. 15 is a flow diagram illustrating an example gesture recognition method.

A flow diagram illustrating an example gesture recognition method is shown in FIG. 15. First, the camera is initialized (step 140). The camera is then set to a low exposure level (step 142). A low exposure setting is used to minimize the amount of light received by the sensor. Exposure is set such that when the IR light (e.g., LED(s)) is illuminated, objects that are within a limited distance from the camera are visible, while most of the scene is not visible or barely visible. Note that bright lights relatively far away and limited scene detail are acceptable as these are subsequently filtered out. Increasing the frame rate (FPS) of the sensor module also improved algorithmic output due to optimization of the image difference step (described in more detail infra) when motion differences are minimized. The ability to illuminate the scene with an IR light, however, may also limit the frame rate. For example, the difference between two frames at 300 fps and 30 fps is a factor of 10. Thus, exposure/FPS tuning can potentially improve algorithmic output. Although the gesture recognition process is not dependent on exposure being set low and frame rate high, additional filtering steps may be required.

The IR LEDs are then turned on and the scene is illuminated (step 144) to pick up any local or nearby gesturing objects. In this step, objects that are within a limited distance from the camera are generally visible to the camera. Note that preferably this step is synchronized such that a frame is not partially illuminated.

A frame with full illumination is captured (image A) and stored for later processing (step 146). In the example implementation, the image is grayscale and has a range of 0 to 255. The resultant output images typically appear very dark, with bright spots for lights. When the IR LED is illuminated, the pointing member becomes slightly visible in the captured image A.

The IR light is then shut off (step 148) and no longer illuminates the scene. It is preferable here as well to synchronize with the sensor to reduce the number of partially illuminated images captured. Then, an image (image B) with no illumination is captured and stored for later processing (step 150). In the example implementation, the captured image has a range of 0 to 255. Note that since this technique uses IR light either (1) a second sensor is required, or (2) a sensor/filter combination may be used in normal image capture applications (as described supra and shown in FIG. 18).

The image difference (image C) between the two frames (images A and B) is then computed (step 152). By computing the difference we perform several important tasks including the following. First, static parts of the image (those regions where the image remains constant, i.e. background, static lights, etc.) are excluded. Second, dark noise is removed. Dark noise is a measure of the variability in pixels read out given relatively constant lighting and scene conditions, i.e. a pixel may read as 10, 15, 11, 13, etc with the same lighting conditions.

Third, since we know we are seeking positive values, any other abnormalities that result in negative pixel values are discarded. For example, registration errors resulting from hand jitter and movement within an image have the capability of creating both positive and negative false values between shots. In practice, however, these false positives are filtered in subsequent steps.

The pseudo code shown below takes as inputs, Image A and Image B and outputs Image C which stores the image difference result. The constant MinDiffThreshold can optionally be set to zero, but can be increased to remove additional dark noise.

```
For y = 0 to height
    For x = 0 to width
        PixelA = ImageA_{x,y}
        PixelB = ImageB_{x,y}
        if PixelA−PixelB >= MinDiffThreshold:
            ImageC_{x,y} = PixelA−PixelB
        else:
            ImageC_{x,y} = 0
        end if
    end for
end for
```

Positive values for Image C tend to indicate the presence of a nearby object. This is because the IR LED is illuminating close by objects in one frame (image A), but not the next frame (image B). This also helps filter out bright lights from a distance because they are always illuminated or constant. A non-zero MinDiffThreshold value effectively performs image filtering by applying a threshold to the difference results (i.e. pixel values) to reduce noise (step 154). Note that the resulting image using non-zero thresholding is essentially a black and white image.

A union find is then performed on the resulting thresholded image (step 156) whereby cluster grouping using union find is used to identify clusters of pixels having adjacent neighbors that make up a larger object. The algorithm also computes basic statistics such as the size of the detected object in pixels. This allows the filtering out of more objects that are likely not pointing members.

Union find method is a general algorithm that is used to associate and identify N distinct objects located in the image by analyzing neighboring pixels. When neighboring pixels are illuminated (i.e. passed the greater than MinDiffThreshold test in step 154) they are grouped together as a single object. After applying the union-find algorithm, small objects are removed along with objects that do not exist on the edges of the image since these are not gestures.

The input to the union find algorithm is ImageC while the output is an ObjectMap which is an array the same size as ImageC (i.e. in width and height) with each (x, y) pair containing a reference to an Object. Each object, in turn, contains a reference to a parent. The ObjectMap is initialized to NULL for each entry.

Let GetNeighbouringObjectsFromMap(Origin$_{x,y}$) represent a scan of nearby pixels from the origin position (radius=N pixels, where N can be tuned but is usually 2-4). This routine returns a set of Objects located in the ObjectMap near the specified origin or an empty set if no Objects exist nearby.

```
// Perform Union-Find
For Each Pixel in ImageC
    If Pixel_val > 0:
        Set X = GetNeighbouringObjectsFromMap(Pixelx,y)
        If sizeof(X) > 0:
            ObjectMap_x,y = X_0
            Delete X_0 // Remove from set
            For Each I in X: // Connect nearby neighbors to the same root
                P = GetParent(I)
                If P.Parent != ObjectMap_x,y:
                    P.Parent = ObjectMap_x,y
// Optimize Map - Make the map reference the root node, and only the
root node
For Each Object_x,y in ObjectMap:
    ObjectMap_x,y = GetParent(Object_x,y)
// Remove small objects
For Each Unique RootObject in ObjectMap:
    Size = sizeof(Instances of RootObject in ObjectMap)
    If Size < ObjectMinSizeThresh: // Remove Objects that are too small
        Delete RootObject in ObjectMap
// Remove Objects that are not connected to the edges of the image
// Note: For EdgeMap we may wish to use a few of the columns along the
edge in case
// the object wasn't detected exactly along the edge.
Set EdgeMap = ObjectMap_y=0, ObjectMap_x=0, ObjectMap_y=height-1,
ObjectMap_x=width-1
For Each Unique RootObject in ObjectMap:
    If RootObject is not in EdgeMap:
        Delete RootObject in ObjectMap
```

Figure 19:
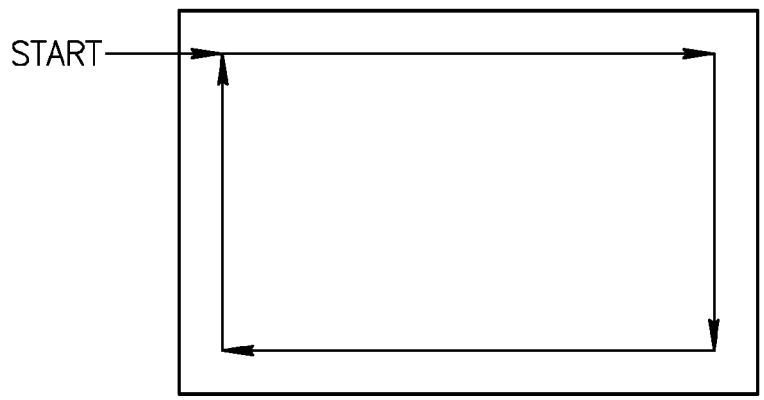
FIG. 19 is a diagram illustrating the edge scan order in obtaining vectors and points for each object.

As an example, the EdgeMap is defined in order as shown in FIG. 19. Small objects not likely to be pointing members and objects not attached to the edge of the image are thus rejected from the results (step 158).

Next, the edges of the image are scanned to obtain the extent of the detected object (step 160). In particular, vectors and points for each remaining object are determined using edge to point conversion (step 160). Edge to point conversion is the final step to processing the image whereby the vector and absolute point of the pointing member in are identified. The assumption used here is that a pointing member must exist from the edge of the sensor to some point inside the image. An example edge to point conversion algorithm is provided below.

```
Set EdgeMap = ObjectMap_x=0, ObjectMap_y=height-1, ObjectMap_x=width-1,
ObjectMap_y=0
Set Result = { } // An empty Set
For Each Unique RootObject in ObjectMap:
    PointA = first RootObject in EdgeMap
    PointB = last RootObject in EdgeMap
    AvgPoint = (PointA + PointB / 2) // Midpoint of a line
    Objects = Each RootObject in ObjectMap
    Farthest = NULL
    FarthestDistance = 0
    For Each Point in Objects:
        Distance = Abs(AvgPoint_x - Point_x)^2 + Abs(AvgPoint_y -
        Point_y)^2
        If Distance > FarthestDistance:
            FarthestDistance = Distance
            Farthest = Point
        Result += [RootObject, PointA, PointB, Farthest] //Adds a tuple
        to the Result
    set
// Order the result list by prioritizing larger objects
Result = Order(Result, By size of RootObject, Descending Order)
If sizeof(Result) > 0:
    // Found a result!
Else:
    // No pointing members detected
```

If the 'Result' object generated is not empty, then it is used to adjust the area of focus/selection as described in step 128 of FIG. 14. Note that the gesture recognition scheme described herein can be used in combination with well known facial recognition algorithms to redirect the area of focus of the digital camera to the face closest to the detected gesture as provided by the contents of the 'Results' object.

Figure 16:
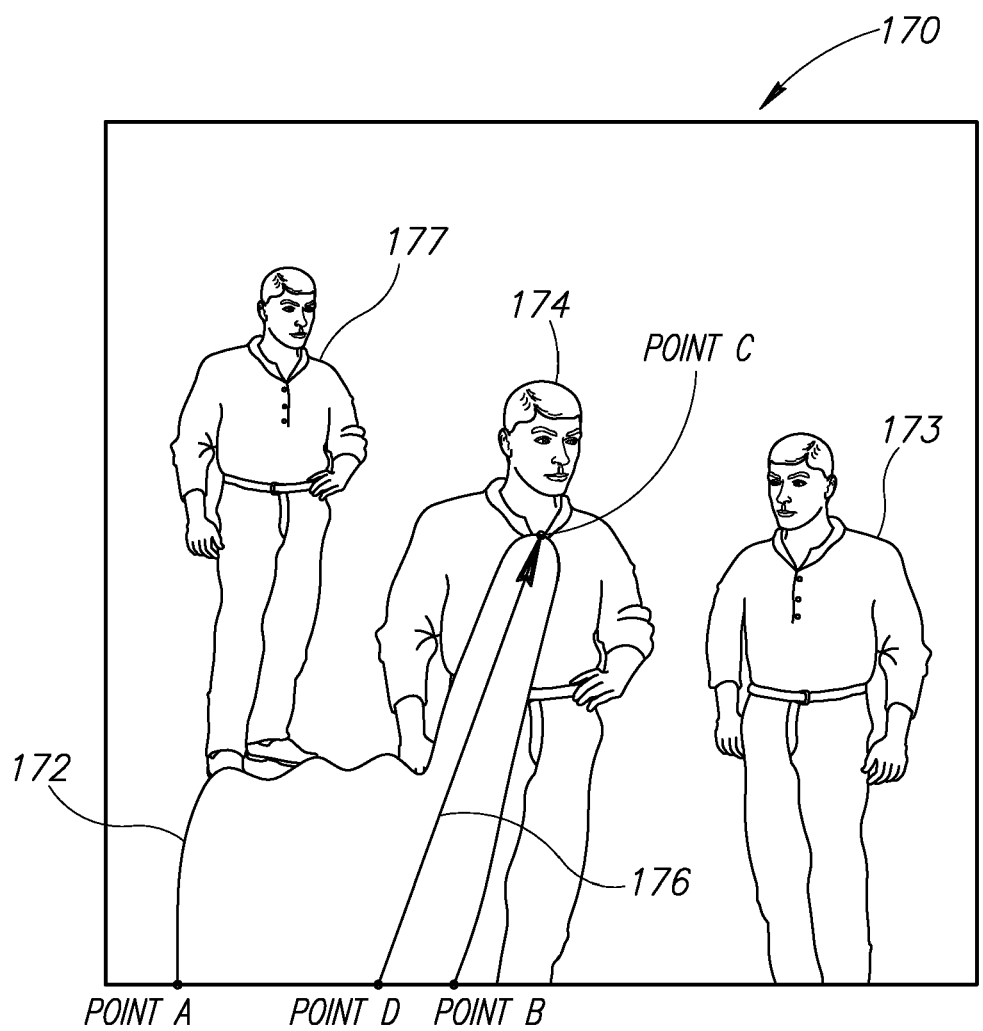
FIG. 16 is a diagram illustrating the recognition of an example hand gesture.
Figure 17:
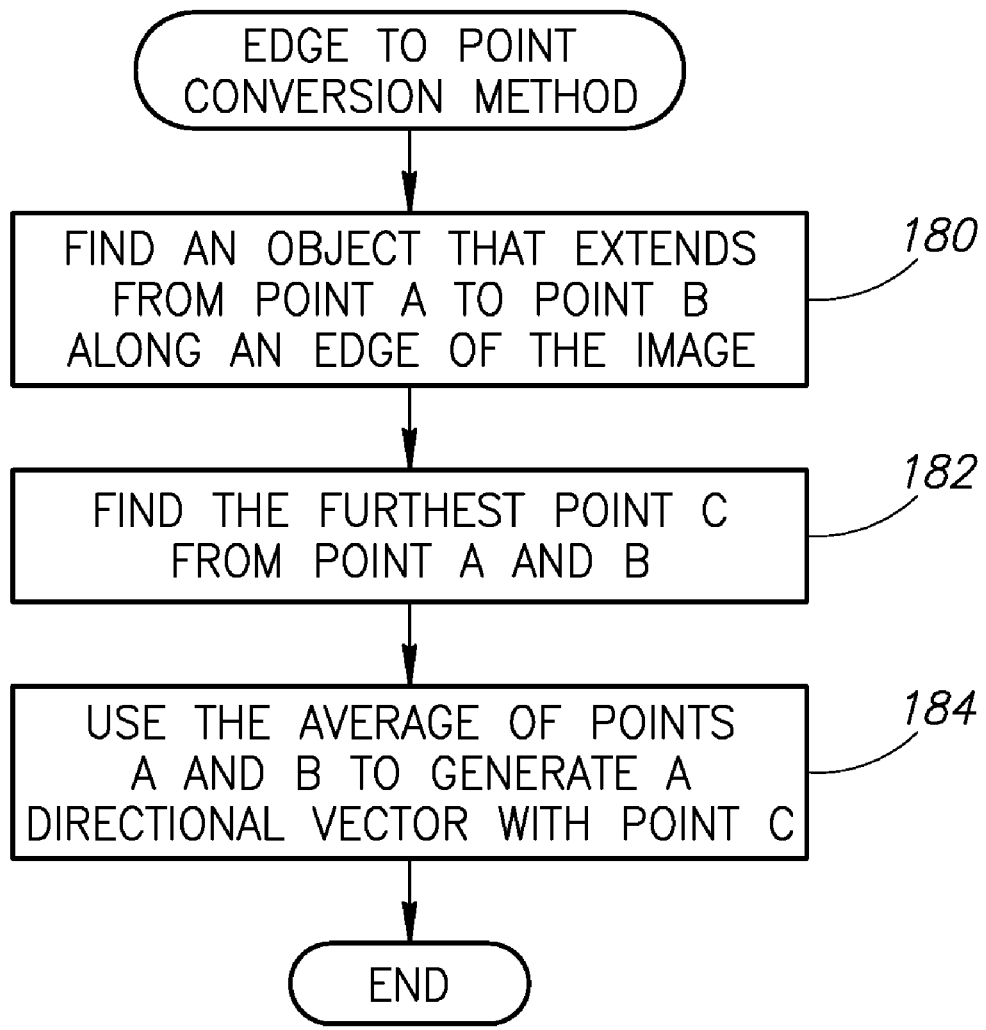
FIG. 17 is a flow diagram illustrating an example edge to point conversion method.

A diagram illustrating the recognition of an example hand gesture is shown in FIG. 16. The image 170 as sensed by the IR sensor comprises subjects 173, 174, 177 and a pointing member (user hand and finger) 172 pointing to subject 174 which is the desired face/area of focus. It is assumed the camera's focus/selection is currently set to other than the desired subject 174. A flow diagram illustrating an example edge to point conversion method is shown in FIG. 17. With reference to FIGS. 16 and 17, the edge to point conversion method will now described in more detail. First, the method finds an object that extends along the edge of the sensor image from Point A to Point B (step 180). The method then finds the furthest Point C from Point A and B (i.e. the absolute point) (step 182). Points A and B are then averaged resulting in point D and a directional vector 176 between point D and Point C is determined (step 184). Note that alternatively, other techniques examine the edge of the object to indentify multiple points. It is this directional vector that is used to select the nearest face or area of focus to select for the new object selection decision.

In the case where an image sensor different from that used to take digital photographs is used for object detection and selection purposes, a transformation step is required (step 162) before the gesture recognition results are generated and output to the next stage of processing (step 164) This is the case when a separate IR LED and image sensor are used for object detection and selection. Note that the IR illuminator and sensor may be integrated into the device (e.g., digital camera, smartphone, etc.) or be located external to such device such as in a separate attached camera. In the transformation step, the points and vectors generated in step 160 are transformed to compensate for the different perspective of the second image sensor/camera that is used to process the gesture information. The transformation effectively translates from the perspective of one camera to another.

Once the gesture points and vector are translated (if required), they are used by the device/camera to perform some action such as adjust the camera focus to a new face or area of focus. Once adjusted, the camera highlights the new face or area of focus for the user to see via the display.

The terminology used herein is for the purpose of describing particular implementations only and is not intended to be limiting of the mechanism. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the mechanism has been presented for purposes of illustration and description, but is not intended to be exhaustive or limited to the mechanism in the form disclosed. As numerous modifications and changes will readily occur to those skilled in the art, it is intended that the mechanism not be limited to the limited number of implementations described herein.

Accordingly, it will be appreciated that all suitable variations, modifications and equivalents may be resorted to, falling within the spirit and scope of the mechanism. The implementations were chosen and described in order to best explain the principles of the mechanism and the practical application, and to enable others of ordinary skill in the art to understand the mechanism for various implementations with various modifications as are suited to the particular use contemplated.

It is intended that the appended claims cover all such features and advantages of the mechanism that fall within the spirit and scope of the mechanism. As numerous modifications and changes will readily occur to those skilled in the art, it is intended that the mechanism not be limited to the limited number of implementations described herein. Accordingly, it will be appreciated that all suitable variations, modifications and equivalents may be resorted to, falling within the spirit and scope of the mechanism.

What is claimed is:

1. A method of object selection for use in a device having digital camera functionality, the method comprising:
    detecting the occurrence of a gesture by a pointing member in an image frame captured by an image sensor;
    recognizing the gesture and determining an object pointed to thereby; and
    selecting the object as a result of the gesture recognition, wherein gesture recognition comprises:
        capturing a first image using infrared (IR) illumination turned on
        capturing a second image using infrared (IR) illumination turned off;
        calculating a third image as the difference between the first and second images;
        performing a union find on the third image to identify one or more distinct objects located in the third image;
        discarding from consideration those of the one or more distinct objects that are smaller than a threshold size;
        discarding from consideration those of the one or more distinct objects that are not along an edge of the third image; and
        determining vectors and points for each of the one or more distinct objects that has not been discarded from consideration.

2. The method in accordance with claim 1, further comprising performing an operation using the selected object.

3. The method in accordance with claim 1, wherein the object comprises a face or area of focus.

4. The method in accordance with claim 1, further comprising displaying an indication that the device is currently using the pointed to object.

5. The method in accordance with claim 1, further comprising maintaining the selection of the object after the pointing member has been removed from the image frame.

6. A method of identifying a desired area of focus for use in a device having digital camera functionality, the method comprising:
    performing gesture recognition to detect a gesture by a pointing member in an image captured by an image sensor;
    recognizing the gesture; and
    determining the area pointed to by the recognized gesture, wherein gesture recognition comprises:
        capturing a first image using infrared (IR) illumination turned on;
        capturing a second image using infrared (IR) illumination turned off;
        calculating a third image as the difference between the first and second images;
        performing a union find on the third image to identify one or more distinct objects located in the third image;
        discarding from consideration those of the one or more distinct objects that are smaller than a threshold size;
        discarding from consideration those of the one or more distinct objects that are not along an edge of the third image; and
        determining vectors and points for each of the one or more distinct objects that has not been discarded from consideration.

7. The method in accordance with claim 6, further comprising:
    changing the current focus of the camera to that of the pointed to area detected as a result of the gesture recognition.

8. The method in accordance with claim 6, further comprising displaying an indication that the current focus of the device is set to the pointed to area.

9. The method in accordance with claim 6, further comprising maintaining the current focus of the camera to that of the pointed to area after the pointing member has been removed from the image frame.

10. The method in accordance with claim 6, further comprising performing image filtering on the third image to yield a filtered third image so that the union is performed on the filtered third image.

11. The method in accordance with claim 6, wherein the image sensor comprises:
    a visible light image sensor;
    an infrared (IR) light image sensor;
    a lens; and
    a reflective IR filter mounted at a substantially 45 degrees between the visible and IR light image sensors, the reflective IR filter operative to pass visible light to the visible light image sensor while reflecting IR light onto the IR light image sensor.

12. A method of object selection for use in a device having digital camera functionality, the method comprising:
    performing gesture recognition to detect the occurrence of a gesture by a pointing member in an image frame captured by an image sensor; and
    identifying that the pointing member points to a particular object and selecting the object in response thereto, wherein gesture recognition comprises:
        capturing a first image using infrared (IR) illumination turned on;
        capturing a second image using infrared (IR) illumination turned off;
        calculating a third image as the difference between the first and second images;
        performing a union find on the third image to identify one or more distinct objects located in the third image;
        discarding from consideration those of the one or more distinct objects that are smaller than a threshold size;
        discarding from consideration those of the one or more distinct objects that are not along an edge of the third image; and
        determining vectors and points for each of the one or more distinct objects that has not been discarded from consideration.

13. The method in accordance with claim 12, further comprising:
    performing an operation using the selected object.

14. The method in accordance with claim 13, wherein the operation comprises selecting and highlighting a face pointed to by the pointing member.

15. The method in accordance with claim 13, further comprising performing image filtering on the third image to yield a filtered third image so that the union is performed on the filtered third image.

16. The method in accordance with claim 12, further comprising displaying an indication that the device is currently using the pointed to object.

17. The method in accordance with claim 12, further comprising maintaining the selection of the object after the pointing member has been removed from the image frame.

18. The method in accordance with claim 12, further comprising performing image filtering on the third image to yield a filtered third image so that the union is performed on the filtered third image.

19. A mobile communications device, comprising:
a digital camera subsystem;
a cellular subsystem;
a memory;
a processor coupled to the one or more radio circuits and the memory, the processor operative:
to perform gesture recognition to detect the occurrence of a gesture by a pointing member in an image captured by an image sensor;
to recognize the gesture; and
to determine an area pointed to by the recognized gesture, wherein gesture recognition comprises:
capturing a first image using infrared (IR) illumination turned on;
capturing a second image using infrared (IR) illumination turned off;
calculating a third image as the difference between the first and second images;
performing a union find on the third image to identify one or more distinct objects located in the third image;
discarding from consideration those of the one or more distinct objects that are smaller than a threshold size;
discarding from consideration those of the one or more distinct objects that are not along an edge of the third image; and
determining vectors and points for each of the one or more distinct objects that has not been discarded from consideration.

20. The mobile communications device in accordance with claim 19, wherein the processor is further operative:
to change the current focus of the camera to that of the pointed to area detected as a result of the gesture recognition.

21. The mobile communications device in accordance with claim 19, wherein the image sensor comprises:
a visible light image sensor;
an infrared (IR) light image sensor;
a lens;
a reflective IR filter mounted at a substantially 45 degrees between the visible and IR light image sensors, the reflective IR filter operative to pass visible light to the visible light image sensor while reflecting IR light onto the IR light image sensor.

22. The mobile communications device in accordance with claim 19, further comprising performing image filtering on the third image to yield a filtered third image so that the union is performed on the filtered third image.

* * * * *